(12) United States Patent
Olsen

(10) Patent No.: US 11,524,719 B2
(45) Date of Patent: Dec. 13, 2022

(54) STEERING WHEEL SENSOR UNIT COMPRISING A RING MAGNET

(71) Applicant: ALLIED MOTION STOCKHOLM AB, Bromma (SE)

(72) Inventor: Erik Olsen, Hässelby (SE)

(73) Assignee: ALLIED MOTION STOCKHOLM AB, Bromma (SE)

( * ) Notice: Subject to any disclaimer, the term of this patent is extended or adjusted under 35 U.S.C. 154(b) by 354 days.

(21) Appl. No.: 16/627,810

(22) PCT Filed: Jun. 28, 2018

(86) PCT No.: PCT/SE2018/050699
§ 371 (c)(1),
(2) Date: Dec. 31, 2019

(87) PCT Pub. No.: WO2019/009789
PCT Pub. Date: Jan. 10, 2019

(65) Prior Publication Data
US 2021/0147000 A1  May 20, 2021

(30) Foreign Application Priority Data

Jul. 3, 2017 (SE) .................................. 1750866-4

(51) Int. Cl.
*B62D 15/02* (2006.01)
*B60R 16/023* (2006.01)
*G01D 5/14* (2006.01)

(52) U.S. Cl.
CPC ...... *B62D 15/0215* (2013.01); *B60R 16/0231* (2013.01); *G01D 5/145* (2013.01)

(58) Field of Classification Search
CPC .... G01D 5/12–185; B62D 15/02–0245; B60R 16/0231
See application file for complete search history.

(56) References Cited

U.S. PATENT DOCUMENTS 2,725,494 A * 11/1955 Anderson ................. G01P 3/49
310/105
6,201,389 B1   3/2001 Apel et al.
6,250,420 B1   6/2001 Brenner et al.
(Continued)

FOREIGN PATENT DOCUMENTS

DE    10 2007 050 209 A1    4/2009
EP          1 382 510 A1    1/2004
(Continued)

OTHER PUBLICATIONS

International Search Report and Written Opinion, dated Sep. 20, 2018, from corresponding/related International Appln. No. PCT/SE2018/050699.

*Primary Examiner* — Huy Q Phan
*Assistant Examiner* — David B Frederiksen
(74) *Attorney, Agent, or Firm* — Nixon & Vanderhye

(57) ABSTRACT

Disclosed is a steering wheel sensor unit, wherein the steering wheel is mounted on a shaft, which is journaled in a housing. The unit includes a ring magnet attached to the shaft within a shaft housing for rotation with the shaft, and sensing elements being arranged radially outside the shaft housing in an encapsulated compartment sensing rotation of the magnet and the shaft through the shaft housing.

16 Claims, 2 Drawing Sheets

(56) References Cited

U.S. PATENT DOCUMENTS

| | | |
|---|---|---|
| 6,389,343 B1 | 5/2002 | Hefner et al. |
| 6,422,336 B1 | 7/2002 | Abele et al. |
| 7,406,884 B2 | 8/2008 | Jerems et al. |
| 2002/0050178 A1 | 5/2002 | Desbiolles |
| 2004/0040395 A1 | 3/2004 | Toratani et al. |
| 2007/0209450 A1* | 9/2007 | Maehara .............. G01L 3/104 73/862.332 |
| 2007/0209864 A1* | 9/2007 | Segawa ............. B62D 5/0409 180/446 |
| 2009/0320613 A1* | 12/2009 | Uehira ................ G01L 3/104 73/862.333 |
| 2010/0289485 A1* | 11/2010 | Eggimann ............ G01L 3/104 324/207.25 |
| 2011/0005340 A1* | 1/2011 | Jeon ..................... B62D 6/10 73/862.193 |
| 2011/0088488 A1* | 4/2011 | Maehara ............... B62D 6/10 73/862.333 |
| 2014/0019009 A1* | 1/2014 | Kogiso ............. B62D 5/0481 701/42 |
| 2016/0214648 A1 | 7/2016 | Schoepe et al. |
| 2017/0241813 A1* | 8/2017 | Ersek ................ G01D 5/2492 |

FOREIGN PATENT DOCUMENTS

| | | |
|---|---|---|
| KR | 20140005061 A | 1/2014 |
| WO | 2005/068962 A1 | 7/2005 |

\* cited by examiner

STEERING WHEEL SENSOR UNIT COMPRISING A RING MAGNET

BACKGROUND OF THE INVENTION

Field of the Invention

The present invention relates to a steering wheel sensor (SWS) unit for sensing a rotation of a steering shaft caused by the steering wheel. Such systems are especially important in steer-by-wire systems, such as those used in lift trucks and similar, in which the steering wheel by means of electrical connections is connected to a motor that turns the wheel(s) to be steered, and the invention essentially intends to solve problems at such steer-by-wire systems, but the sensor unit is useful also for deciding the rotation of a steering shaft in mechanical steering systems.

Description of the Related Art

The main function of the steering wheel sensor unit is to measure the angle or rotation or speed of the steering wheel (the input shaft). In a steer-by-wire system it is also important to get a comfortable and robust feeling, and in such systems the steering wheel sensor unit should also have some friction when it is rotated so that the driver can get some resistance when rotating the steering wheel. The unit must also incorporate bearings/bushings and mechanical structures to be able to withstand external forces applied to the shaft.

A SWS unit in steer-by-wire systems exists basically in two mechanical versions, with different friction concepts, but some characteristics common for both mechanical versions.

In the first friction concept the friction is created by mechanical means to get a comfortable steering. Such mechanical means can comprise slide bearings, bushings, springs, sealing rings etc.

In the second friction concept the friction is created by magnetic means, which allows some advantages over a typical mechanical friction device. One of the advantages is that there is no slip-stick. This gives a better feeling and it is easier for an operator/driver to make small steering adjustments. It has a constant friction behavior over a wide temperature range and over the lifetime of the device, as there is no wear.

Examples of known concepts for obtaining a measurement of the rotation of the steering wheel and providing a feedback to the driver, are available.

E.g. LORD Corporation, US, has a steering by wire system, in which a tactile feedback can be obtained, by programming related software. In this system bearing support for the steering wheel is combined with steering position sensing, communication and continuously variable resistive steering torque. The system uses a unit comprising a housing in which a steering wheel shaft is journaled, and a rotor of magnetically responsive material is attached to the shaft. The housing comprises a fixed stator and at the outer periphery of the rotor low power coils are arranged to acting on the steering command induce a magnetic field changing the properties of the magnetic responsive material of the rotor to induce a torque feedback. Further, for measuring the steering angle a magnet is arranged on the end of the shaft, and at a short distance from this a magnetic sensing chip is arranged to give a value on the steering angle and further transmitting this signal to a vehicle steering controller.

Also the Swedish company SKF provides steering encoder units using non-contact incremental sensors to track the movement of a steering wheel. These units comprise magnetic sensors which do not wear, and are protected from external influences. A friction torque device provides feedback to the operator by providing adequate resistance in the steering wheel.

In U.S. Pat. No. 6,389,343 is shown and described an apparatus and methods for controlling the resistance to the movement of a steering shaft that is operable to move as a function of an operator input. A position sensor is coupled with the steering shaft and transmits a shaft position signal as a function of the position of the steering shaft. A processing device is coupled with the position sensor to receive the shaft position signal and transmits a resistance signal as a function of the shaft position signal. A resistance device is coupled with the processing device to receive the resistance signal and is coupled with the steering shaft, the resistance device resists the movement of the steering shaft as a function of the resistance signal.

From EP 1 382 510 A1 is known a device for deciding a steering angle of a steering shaft as well as the torque applied on the steering shaft. The angle is measured by means of optical means, and the torque is measured by means of a magnetoresistive sensor. This device is, however, not intended for giving any feedback to the driver, and the sensing parts are not protected against any penetration of fluids from the outside.

Also US 2004/0040395 A1 shows a rotation sensor, such as a steering sensor for an automobile, which is capable of measuring the angle of rotation of a shaft and the torque acting thereon. This device is, like the previous one, not intended for giving any feedback to the driver, and the sensing parts are not either protected against any penetration of fluids from the outside.

SUMMARY OF THE INVENTION

The object of the present invention is to provide a novel steering wheel sensor unit which solves any of the problems mentioned above, and in addition is inexpensive and provides for a low total height of a device including the steering wheel sensor.

Another object of the invention is to provide a steering wheel sensor unit in which any electronics for the sensing part can be safely protected from penetration of water or moisture.

A further object of the invention is to provide a steering wheel sensor unit that can be easily combined with a friction generating means for obtaining a resistance to the rotation of the steering wheel.

The above objects of the invention are obtained by a steering wheel sensor unit in which a steering wheel is mounted on a shaft, which is journaled in a shaft housing, and wherein the unit comprises a ring magnet attached to the shaft within the shaft housing for rotation with the shaft, and that sensing elements being arranged radially outside the shaft housing in an encapsulated compartment sensing rotation of the magnet and the shaft through the shaft housing.

According to a further preferred embodiment of the invention, a flange is provided at the upper part of the shaft housing and extending outwardly of the shaft housing, and an encapsulation is arranged on the underside of the flange outside of the shaft housing, which encapsulation encloses the sensing elements and associated electronics.

In a more preferred embodiment of the invention especially useful in a steer-by-wire system, a magnetic hysteresis loss plate is arranged inside the shaft housing and peripherally encircling the major part of the periphery of the ring magnet, except for a peripheral opening, and wherein the sensing elements outside the shaft housing are arranged across the opening in the magnetic hysteresis loss plate. The magnetic hysteresis loss plate will provide friction to a rotating magnet. With this arrangement, the same magnet as is used for sensing is also used for magnetic friction.

In an even more preferred embodiment of the invention, the magnetic hysteresis loss plate is provided with tapered ends towards the opening, so that the height of the magnetic hysteresis loss plate is lower close to the opening and then rising to its full height. The purpose of the tapered ends is to avoid uneven torque, e.g. cogging torque.

In an alternative embodiment of the invention, the height of the magnetic hysteresis loss plate is essentially constant and the poles of the magnet are angled.

In a further alternative embodiment of the invention a magnetic hysteresis loss plate is arranged inside the shaft housing and peripherally completely encircling the periphery of the ring magnet, wherein the height of the magnetic hysteresis loss plate is less than that of the magnet, and wherein the sensing elements outside the shaft housing are arranged at a level below or above that of the magnetic hysteresis loss plate.

BRIEF DESCRIPTION OF THE DRAWINGS

The invention will now be further described with the help of a non-limiting preferred embodiment of the invention, shown on the enclosed schematic drawings, wherein.

DESCRIPTION OF THE PREFERRED EMBODIMENTS

Figure 1:
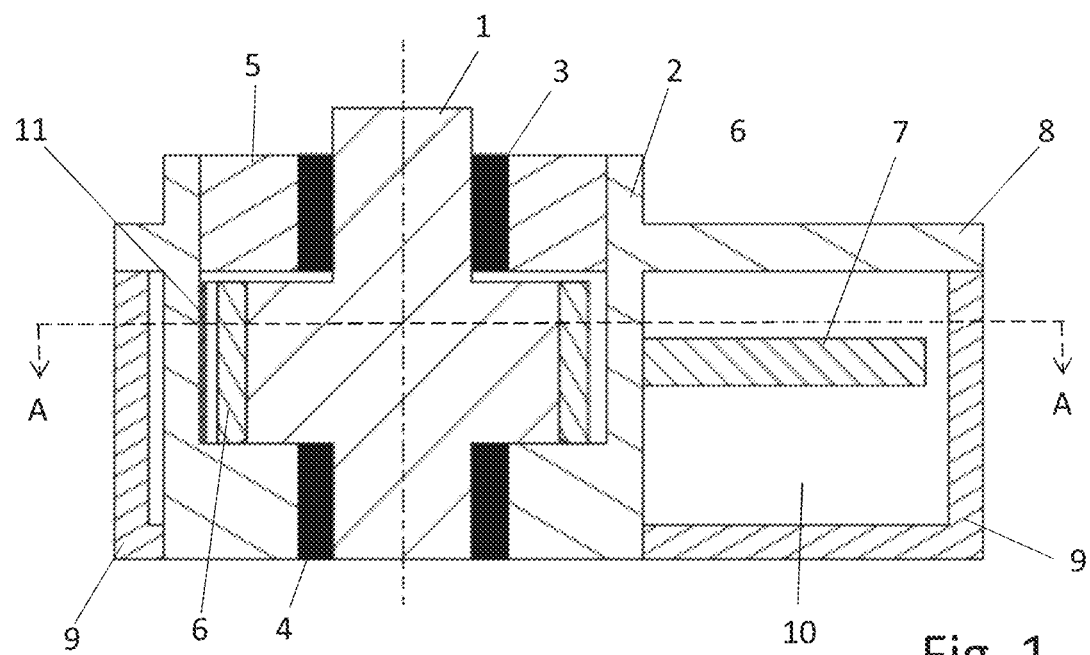
FIG. 1 shows a vertical section view of a steering wheel sensor according to the invention.

In FIG. 1 is shown a vertical section view of a steering wheel sensor unit arranged at a steering wheel shaft 1, which is journaled in a shaft housing 2 by means of two bearings 3 and 4. Bearings could be of any kind, e.g. ball bearings/roller bearings, slide bearings/bushings etc. The lower bearing 4 sits directly in the shaft housing 2, and the upper bearing 3 sits in a lid 5. The interior of the shaft housing 2 is preferably circular, and so circumferentially enclosing the shaft 1. The shaft 1 is preferably provided vid radially widened part 1a being located within the interior of the shaft housing 2. The widened part 1a could of course also be a separate part arranged on the shaft 1. A ring magnet 6 is provided on the periphery of the widened part 1a of the shaft 1, thus circumferentially surrounding the shaft 1 and rotatable with the shaft inside the interior of the shaft housing 2.

Outside of the shaft housing 2, at the height of the ring magnet 6 on the widened part 1a of the shaft 1, sensors and electronics 7 are arranged for detecting the rotation of the shaft 1 by sensing the magnetic field caused by the rotating magnet 6. A flange 8 can be arranged and preferably integrated with the shaft housing 2, at the upper part of the housing 2 and thus covering the electronics 7. An electronics housing 9 is arranged to cover the electronics 7, and can be connected to the shaft housing 2 from its lower side, surrounding the lower end being provided with the bearing 4, and from the underside abutting the flange 8, and in this way forming an electronics compartment 10 for the electronics 7.

The electronics 7 for sensing the rotation of the magnet 6 and thereby the rotation of the steering wheel shaft 1 may e.g. include a hall effect chip arranged to give a value on the steering angle and through a wiring, not shown, transmitting this signal to a vehicle steering controller. Of course, also other suitable means for sensing the rotation of the magnet 6 can be used for giving a signal indicative of the rotation of the steering wheel shaft 2.

Figure 2:
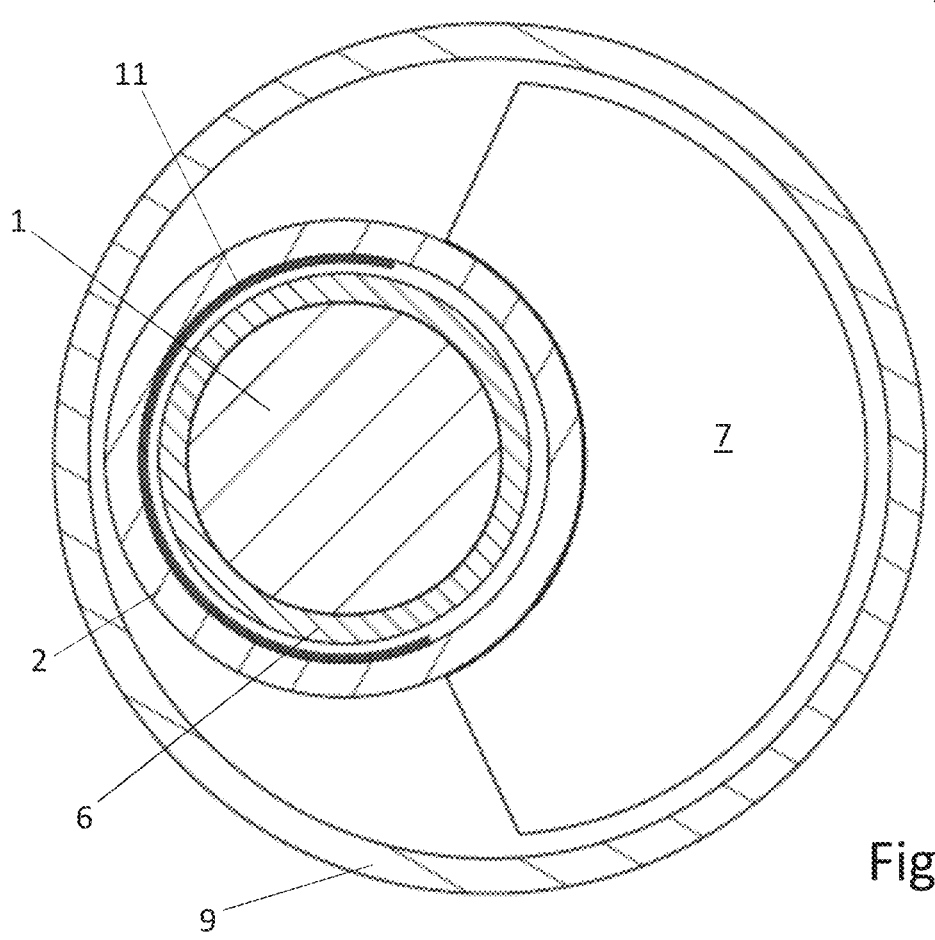
FIG. 2 shows a horizontal cross section view of the steering wheel sensor shown in FIG. 1, taken according to arrows A-A in FIG. 1.

In an especially preferred embodiment of the invention the steering wheel sensor unit is combined with a friction generating means for obtaining a resistance to the rotation of the steering wheel. In that case the ring magnet 6 inside the shaft housing 2 interior is surrounded, at least partially, by a magnetic hysteresis loss plate 11, being arranged as part of a circular ring and surrounding at least that part of the ring magnet 6 that not is on the side of the shaft housing where the sensors and electronics 7 are located. This is especially shown in FIG. 2.

The losses caused in the magnetic hysteresis loss plate, by the fluctuating magnetic field from the rotating magnet, results in a magnetic (torque) friction on the rotating magnet/shaft.

The magnetic hysteresis loss plate 11 is preferably of a material belonging to the general group of Vicaloy®, hard magnetic alloy, (e.g. Fe-52Co-14V). The magnetic hysteresis loss plate 11 is arranged inside the shaft housing 2 and peripherally encircling the major part of the periphery of the ring magnet 6, except for a peripheral opening, and wherein the sensing elements in the electronics 7 outside the shaft housing 2 are arranged across the opening in the magnetic hysteresis loss plate 11. According to another embodiment incorporating the magnetic hysteresis loss plate 11 this is provided with tapered ends towards the opening, so that the height of the magnetic hysteresis loss plate is lower close to the opening and then rising to its full height. In a variant, the height of the magnetic hysteresis loss plate 11 is essentially constant and the poles of the magnet are angled. The purpose of the tapered ends or angled poles is to avoid/mitigate cogging torque.

Figure 3:
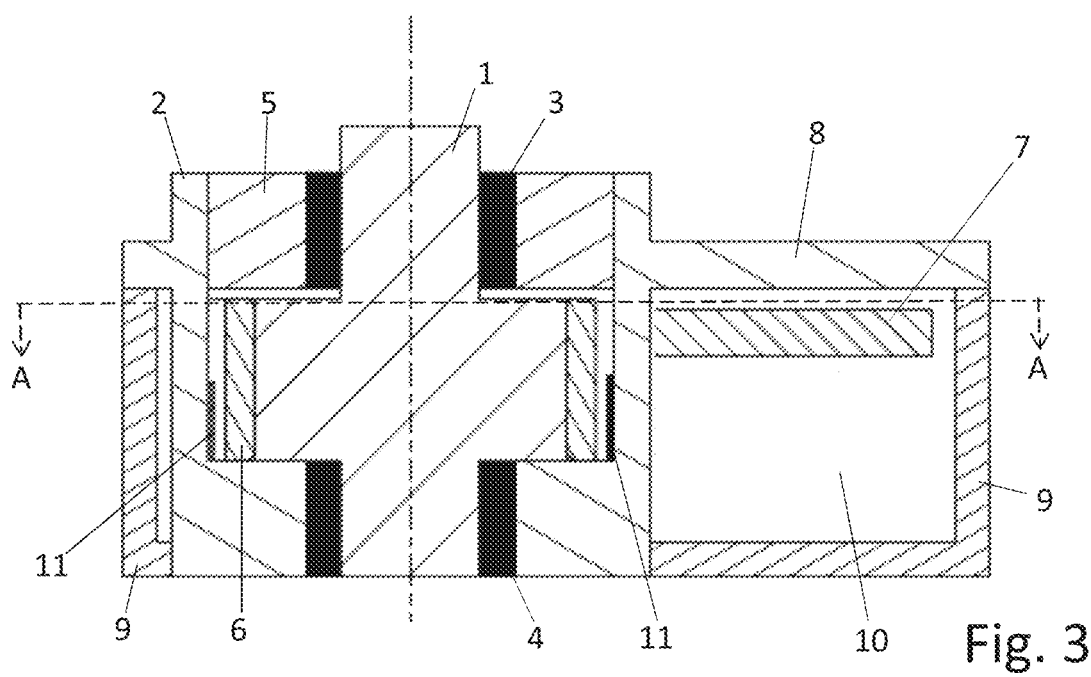
FIG. 3 shows a view similar to FIG. 1 but of an alternative embodiment.
Figure 4:
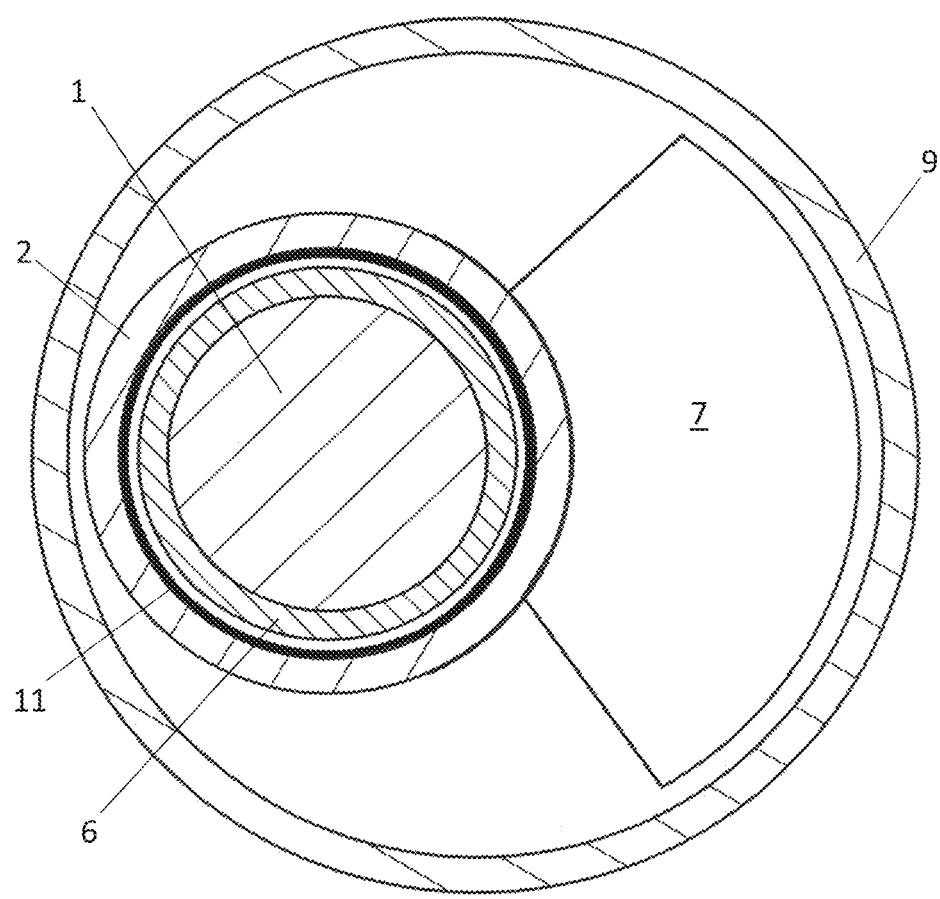
FIG. 4 shows a view similar to FIG. 2 but of the alternative embodiment according to FIG. 3.

In an alternative embodiment, shown in FIGS. 3 and 4, the magnetic hysteresis loss plate 11 is arranged inside the shaft housing 2 and peripherally completely encircling the periphery of the ring magnet 6, wherein the height of the magnetic hysteresis loss plate 11 is less than that of the magnet 6, and wherein the sensing elements 7 outside the shaft housing 2 are arranged at a level below or above that of the magnetic hysteresis loss plate 11.

If a magnet with one pole-pair (magnetized diametrically) is used, the sensing could reveal the absolute angle of the shaft. For different reasons, it may not be feasible to use a single pole-pair magnet, e.g. for magnetic friction or sensing reasons.

If the magnet has multiple pole-pairs, the sensing would not provide absolute angle of the shaft, only incremental information would be available (or absolute angle within any pole-pair). Incremental information is however sufficient in many applications, e.g. in fork lift trucks.

If multiple pole-pairs are needed, absolute angle information could still be achieved with the following arrangement: The magnet is divided into/seen as two parts, an upper half, and a lower half. The two halves are magnetized with different pole count, e.g. the lower half with four pole-pairs and the upper half with five pole-pairs. By using two angle sensors, one for each half (could e.g. be mounted on different sides of a printed circuit board), and looking at the combination of the two sensed angles, the absolute angle could be calculated.

A ring magnet is attached to the shaft. The magnetic fields around the shaft reveal the angle/rotation of the shaft. Sensing of the shaft angle/rotation is done on the side (radially) of the shaft/magnet. This allows for the bearings/bushings to be as far away from each other as possible, which gives a mechanically stable solution with low forces on the bearings.

The rotating parts, shaft 1 and magnet 6, are environmentally separated from the electronics 7. This is done by having the shaft housing 2 formed as a "tube", integrated with the flange 8, which goes down around the shaft. The electronics 7 is on the outside of this "tube", encapsulated by the electronics house 9, formed as a plastic "cup". The compartment 10 for the electronics 7 is hermetically sealed from the outside environment, no "sliding" seal needed. The shaft 1, inside the tube, is not as protected as the electronics 7. Water could potentially intrude inside the tube, but this should flow out at the bottom. The shaft 1 and other parts (6, 11) inside the tube are not sensitive to water. This means that the angle/rotation sensing elements in the electronics 7 measures the magnetic field through the tube wall.

With an arrangement of the steering wheel sensor unit according to the present invention a big advantage is that the steering wheel sensor unit is flat, i.e. has a low height in order to be accommodated e.g. in an armrest of a lift truck.

One advantage with the mechanical arrangement according to the present invention is that it allows for a hollow shaft solution, i.e. that the steering shaft is hollow. This arrangement could be beneficial for the mounting of the steering wheel.

Above has been described that the magnet preferably is a ring magnet. However, a ring magnet could be replaced by a number of discrete magnets arranged at a small distance from each other around the periphery of the steering shaft, e.g. being fastened to the shaft by means of an adhesive.

The magnetic hysteresis loss plate material could also be replaced by any other material, which causes losses when exposed to fluctuating magnetic fields. It could for example be a current conducting material, where eddy currents, resulting from the fluctuating magnetic fields, would cause losses. This material could possibly be integrated with the shaft housing, and a peripheral opening where the sensing elements are located would possibly not be needed.

A steering wheel sensor unit according to the present invention can as mentioned above, not only be used in a steer-by-wire system, but the sensing unit can also be used for an ordinary steering shaft, being mechanically connected to a steering gear, such as in a car, a truck or any other vehicle provided with a mechanical steering system.

The invention claimed is:

1. A steering wheel sensor unit the steering wheel sensor unit comprising:
   a ring magnet attached to a shaft journaled within a shaft housing for rotation with the shaft, a steering wheel being mounted on the shaft;
   a plurality of sensing elements disposed radially outside the shaft housing in an encapsulated compartment, the sensing elements being configured to sense rotation of the ring magnet and the shaft through the shaft housing; and
   a magnetic hysteresis loss plate disposed inside the shaft housing cooperating with the ring magnet used to sense the rotation of the shaft, creating a friction force when the shaft is rotated, the magnetic hysteresis loss plate peripherally encircling a part of a periphery of the ring magnet, except for a peripheral opening, the sensing elements outside the shaft housing being disposed across the opening in the magnetic hysteresis loss plate,
   wherein the steering wheel sensor unit is configured for a steer-by-wire system.

2. The steering wheel sensor unit according to claim 1, further comprising:
   a flange at an upper part of the shaft housing and extending outwardly of the shaft housing; and
   an encapsulation disposed on an underside of the flange outside of the shaft housing, the encapsulation encloses the sensing elements.

3. The steering wheel sensor unit according to claim 2, wherein the steering wheel is connected to a motor by electrical connections, the motor being configured to turn the steering wheel.

4. The steering wheel sensor unit according to claim 3, wherein the ring magnet is divided into two parts including an upper half and a lower half,
   wherein the two halves are magnetized with different pole count, and two angle sensors are disposed with one for each of the magnet halves.

5. The steering wheel sensor unit according to claim 2, wherein the ring magnet is divided into two parts including an upper half and a lower half,
   wherein the two halves are magnetized with different pole count, and two angle sensors are disposed with one for each of the magnet halves.

6. The steering wheel sensor unit according to claim 1, wherein the steering wheel is connected to a motor by electrical connections, the motor being configured to turn the steering wheel.

7. The steering wheel sensor unit according to claim 6, wherein the ring magnet is divided into two parts including an upper half and a lower half,
   wherein the two halves are magnetized with different pole count, and two angle sensors are disposed with one for each of the magnet halves.

8. The steering wheel sensor unit according to claim 1, wherein the magnetic hysteresis loss plate is provided with tapered ends towards the opening, so that a height of the magnetic hysteresis loss plate is lower close to the opening and then rising to its full height.

9. The steering wheel sensor unit according to claim 8, wherein the ring magnet is divided into two parts including an upper half and a lower half,
   wherein the two halves are magnetized with different pole count, and two angle sensors are disposed with one for each of the magnet halves.

10. The steering wheel sensor unit according to claim 1, wherein a height of the magnetic hysteresis loss plate is essentially constant and the poles of the magnet are angled.

11. The steering wheel sensor unit according to claim 10, wherein the ring magnet is divided into two parts including an upper half and a lower half,
    wherein the two halves are magnetized with different pole count, and two angle sensors are disposed with one for each of the magnet halves.

12. The steering wheel sensor unit according to claim 1, wherein the hysteresis loss plate is configured to be replaced by another material which results in losses when exposed to fluctuating magnetic fields.

13. The steering wheel sensor unit according to claim 12, wherein the ring magnet is divided into two parts including an upper half and a lower half, wherein the two halves are magnetized with different pole count, and two angle sensors are disposed with one for each of the magnet halves.

14. The steering wheel sensor unit according to claim 1, wherein the ring magnet is divided into two parts including an upper half and a lower half, wherein the two halves are magnetized with different pole count, and two angle sensors are disposed with one for each of the magnet halves.

15. A steering wheel sensor unit the steering wheel sensor unit comprising:

a ring magnet attached to a shaft journaled within a shaft housing for rotation with the shaft, a steering wheel being mounted on the shaft;

a plurality of sensing elements disposed radially outside the shaft housing in an encapsulated compartment, the sensing elements being configured to sense rotation of the ring magnet and the shaft through the shaft housing; and a magnetic hysteresis loss plate disposed inside the shaft housing cooperating with the ring magnet used to sense the rotation of the shaft, creating a friction force when the shaft is rotated, the magnetic hysteresis loss plate peripherally completely encircling a periphery of the ring magnet, wherein a height of the magnetic hysteresis loss plate is less than a height of the magnet, the sensing elements outside the shaft housing are disposed at a level below or above that of the magnetic hysteresis loss plate, and the steering wheel sensor unit is configured for a steer-by-wire system.

16. The steering wheel sensor unit according to claim 15, wherein the ring magnet is divided into two parts including an upper half and a lower half, wherein the two halves are magnetized with different pole count, and two angle sensors are disposed with one for each of the magnet halves.

\* \* \* \* \*